United States Patent
Rerucha (10) Patent No.: US 6,858,053 B2
(45) Date of Patent: Feb. 22, 2005

(54) EXHAUST SYSTEM, IN PARTICULAR, FOR HOUSING-TYPE ENCLOSURES OF MACHINE TOOLS

(76) Inventor: Raimund Rerucha, Maierwaldstr. 6, 70499 Stuttgart (DE)

( * ) Notice: Subject to any disclaimer, the term of this patent is extended or adjusted under 35 U.S.C. 154(b) by 94 days.

(21) Appl. No.: 10/319,837

(22) Filed: Dec. 16, 2002

(65) Prior Publication Data

US 2003/0140795 A1 Jul. 31, 2003

(30) Foreign Application Priority Data

Dec. 17, 2001 (DE) ..................................... 201 20 755 U
Dec. 17, 2001 (DE) ..................................... 201 20 754 U
Dec. 12, 2002 (DE) ......................................... 102 59 253

(51) Int. Cl.[7] .............................................. B01D 46/00
(52) U.S. Cl. ...................... 55/385.1; 55/302; 55/357; 55/385.2; 55/385.4; 55/467; 55/490; 55/DIG. 18; 55/DIG. 30; 55/DIG. 32; 96/233; 454/49; 454/53
(58) Field of Search ............................. 55/302, 385.1, 55/385.2, 385.4, 467, 490, 529, DIG. 18, DIG. 30, DIG. 32, DIG. 36, DIG. 46, 357; 96/233; 454/49, 53

(56) References Cited

U.S. PATENT DOCUMENTS

| | | | | |
|---|---|---|---|---|
| 3,899,043 A | * | 8/1975 | Hall ............................ | 454/49 |
| 4,091,719 A | * | 5/1978 | Galloway .................. | 55/385.2 |
| 4,100,982 A | * | 7/1978 | Wilkinson et al. ......... | 55/385.1 |
| 4,520,717 A | * | 6/1985 | Bohrer et al. .......... | 55/DIG. 36 |
| 4,606,260 A | * | 8/1986 | Cox ...................... | 55/DIG. 18 |
| 5,865,880 A | * | 2/1999 | Matsui ........................ | 55/467 |
| 6,214,073 B1 | * | 4/2001 | Chiang et al. ............. | 55/385.1 |
| 6,338,675 B2 | * | 1/2002 | Winkelman ................ | 55/385.2 |
| 2002/0083691 A1 | * | 7/2002 | Chang ....................... | 55/385.1 |

* cited by examiner

Primary Examiner—Duane Smith
Assistant Examiner—Jason M. Greene
(74) Attorney, Agent, or Firm—Gudrun E. Huckett (57) ABSTRACT

An exhaust system for housing-type enclosures of machine tools is provided for removing air by suction from the interior of the enclosure. The cuttings which are produced during machining of the workpieces are distributed within the working chamber and are thrown to the exhaust location and removed by suction. The cuttings collect in the exhaust area and present a safety risk. In order to prevent undesirable components in the exhaust air from reaching the exhaust system, an air-permeable catch device is provided in the exhaust area in front of the exhaust location. On the catch device, the undesirable components are caught while the exhaust action itself is not impaired. The catch device is a basket having walls made of mesh.

44 Claims, 5 Drawing Sheets

EXHAUST SYSTEM, IN PARTICULAR, FOR HOUSING-TYPE ENCLOSURES OF MACHINE TOOLS

BACKGROUND OF THE INVENTION

1. Field of the Invention

The invention relates to an exhaust system, in particular, for housing-type enclosures of machine tools, comprising at least one exhaust location, preferably, an exhaust socket connected to a mounting frame:

2. Description of the Related Art

Exhaust systems are known which are provided on housing-type enclosures of machine tools. During operation of the machine tool, air is constantly removed from the interior of the enclosure by this exhaust system. In general, the culling speeds of the machine tools are high so that during machining of the workpieces cuttings are distributed in the entire working space of the enclosure and are thrown toward the exhaust location and removed by suction. Residual cuttings in the exhaust area, for example, in the exhaust pipe, result in the formation of nests of cuttings which represent a high safety risk.

SUMMARY OF THE INVENTION

It is an object of the invention to configure the exhaust system of the aforementioned kind such that unwanted components in the exhaust air cannot enter the exhaust device.

This object is solved according to the invention for the exhaust system of the aforementioned kind in that the exhaust system has at least one air-permeable catch device in the exhaust area in front of the exhaust location.

In the exhaust system according to the present invention, the catch device prevents undesirable components in the exhausted medium from reaching the exhaust device. The undesirable components are intercepted by the catch device. Since the catch device is air-permeable, the exhaust action itself is not impaired.

In a special configuration, the catch device is in the effective range of at least one cleaning unit. By means of the cleaning unit, the catch device can be freed of caught components which should not be exhausted. Since the cleaning unit is provided on the exhaust system, a manual cleaning of the catch device is not required. In this way, the exhaust system according to the invention can be mounted also where a manual cleaning of the catch device is not possible or possible only with great expenditure. Often, the exhaust unit is positioned at a great height so that auxiliary means such as ladders are required for cleaning the catch device. When the exhaust unit is provided on an enclosure for a machine tool, the machine tool must be shut down for cleaning the catch device. With the exhaust system according to the invention, cleaning of the catch device can be performed even while the machine tool is operating.

According to a further embodiment, the exhaust socket of the exhaust system according to the invention is provided with a positive-locking counter element which interacts with the positive-locking element of the clamping ring. It is seated on the exhaust hose and inserted into the exhaust socket against whose inner wall it is positioned under tension. By means of the positive-locking connection, it is ensured in a simple and reliable fashion that the exhaust hose cannot be accidentally pulled out of the exhaust socket.

The exhaust system according to the invention is characterized in that it has three interfaces which can be arranged closely adjacent to one another so that the exhaust system has a compact configuration. The first interface is formed by the catch device which is positioned in the exhaust direction in front of the exhaust location. The second interface is formed by the cleaning unit with which, as needed, the caught particles contained in the exhausted air can be removed from the catch device. The third interface finally is formed by the exhaust socket to which a flexible exhaust hose can be connected in a simple way.

It is particularly advantageous when the exhaust system is detachably mounted. It is then possible to detach it easily, when needed, in order to service it, for example.

According to a further configuration according to the invention, the exhaust system is attached by a clamping device on the mounting location. The clamping device enables simple mounting and demounting.

Further features of the invention result from the additional claims, the description, and the drawings.

BRIEF DESCRIPTION OF THE DRAWINGS

The invention will be explained in more detail with the aid of an embodiment illustrated in the drawings. It is shown in.

DESCRIPTION OF PREFERRED EMBODIMENTS

Figure 1:
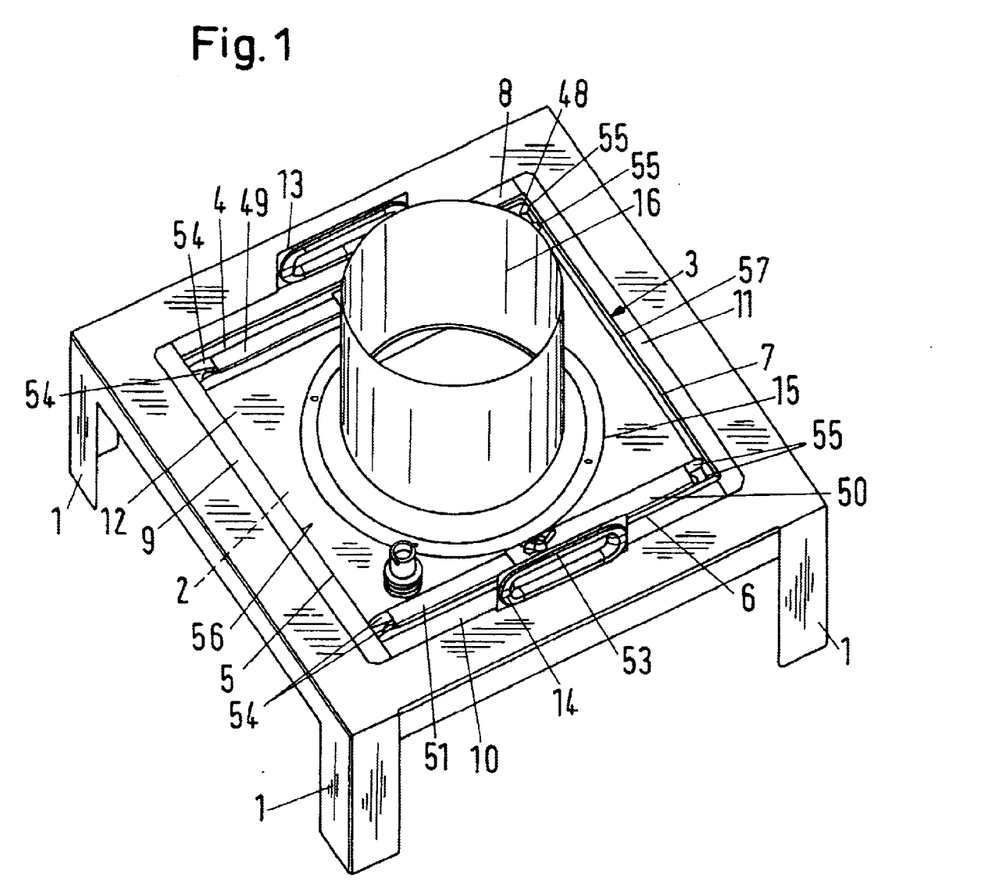
FIG. 1 a perspective illustration of an exhaust system according to the invention.
Figure 2:
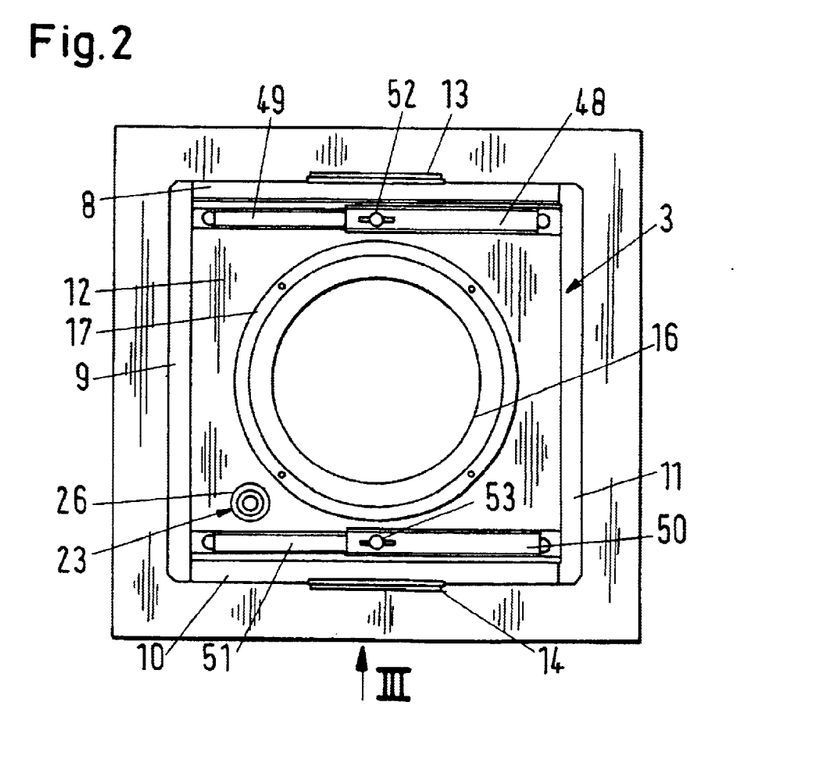
FIG. 2 a plan view onto the exhaust system according to FIG. 1.
Figure 3:
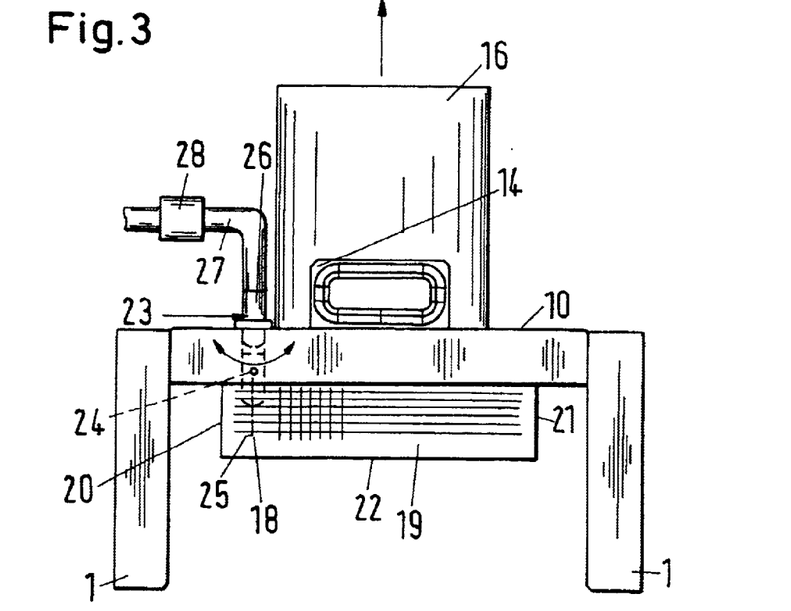
FIG. 3 a view in the direction of arrow III of FIG. 2.

The exhaust system is used in connection with enclosures of machine tools. Such machine tools are, for example, machining centers which are arranged within a housing-type enclosure. At least during processing of the workpieces on the machine, the exhaust system is switched on. The enclosure is illustrated in FIGS. 1 and 3 by profiled sections 1. The enclosure is, of course, provided with closed sidewalls and a closed ceiling. For receiving the exhaust system, the enclosure 1 is provided with a corresponding mounting opening 2 which is provided in the sidewalls and/or in the corner of the enclosure.

The exhaust system comprises a mounting frame 3 which, in this embodiment, has a square contour but, of course, can have any other suitable contour. The frame sides 4 to 7 have an edge 8 to 11 angled outwardly at a right angle, and the mounting frame 3 overlaps with its edge the rim of the mounting opening 2. By means of these angled edges 8 to 11, the mounting frame 3 rests on the outer side of the sidewall or ceiling of the housing-type enclosure 1.

The frame sides 4 to 7 are positioned at a right angle relative to the base plate 12, which is recessed relative to the angled edges 8 to 11 of the frame sides 4 to 7.

In order for the mounting frame 3 to be mounted and, if needed, detached easily, it is provided on two opposed frame sides 4, 6 with an upwardly extending handle 13, 14, respectively, which is fastened on the corresponding frame sides in a suitable way.

The base plate 12 has preferably centrally an opening 15 to which is connected an exhaust socket 16. It has a circular cross-section and is positioned with an annular flange 17 on the base plate 12. The annular flange 17 is mounted by means of screws or the like on the rim of the opening 15 on the base plate 12.

In the area underneath the exhaust socket 16, a cuttings basket 18 is provided which is comprised of a wire mesh or plastic mesh. The cuttings basket 18 has sidewalls 19 to 21 which adjoin one another at a right angle and a bottom 22 which connects the sidewalls 19 to 21 with one another. The sidewalls 19 to 21 reach down to the baseplate 12 and are connected to its inner side in a suitable way. The cuttings basket 18 serve for catching the cuttings, which are produced in the working space of the enclosure when machining the workpieces by means of the machine tool and which are sucked away, so that they cannot reach the exhaust socket 60. The cuttings are caught on the outer side of the cuttings basket 18 whose mesh is so fine that the cuttings cannot penetrate. In order to compensate at least as much as possible the cross-sectional loss caused by the presence of the mesh of the cuttings basket 18, the mesh basket is formed in the described way as a hood with four lateral walls and a bottom so that the air can enter via five sides of the cuttings basket 18. The air resistance is maximally approximately 20 Pa. Since it is prevented that workpiece cuttings reach the exhaust system, no deposits will form in the hose connected to the exhaust socket 16. In this way, damage of the exhaust device is reliably prevented without this going hand in hand with an increased air resistance at the exhaust location.

In order to be able to remove from the cuttings basket 18 the cuttings which have collected on the exterior side of the cuttings basket 18, the exhaust system is provided with at least one cleaning unit 23. It has a cleaning nozzle 24 which projects into the cuttings basket 18 and which is provided with a nozzle opening 24 (not illustrated) from which a cleaning medium emerges in a way to be described in the following. The cleaning nozzle 24 is supported in a holder 26 so as to be rotatable about its axis 25 (FIG. 3); the holder projects through the base plate 12 and is connected to the base plate. The cleaning unit 23 is provided in an area between the exhaust socket 16 and a corner area of the base plate 12. The axis of rotation 25 of the cleaning nozzle 24 is positioned perpendicularly to the base plate 12.

A supply line 27 is connected to the holder 26 and a cleaning medium, preferably, a cooling lubricant, is supplied via the supply line. A solenoid valve 28 is positioned in the supply line 27 for controlling the supply of the cleaning medium. The solenoid valve 28 is electrically controlled in order to open or close the supply line 27. Instead of the solenoid valve 28, it is also possible to provide a manually operated valve.

When a cleaning process is to be performed, the solenoid valve 28 is actuated and the supply line 27 opened. In this way, the cleaning medium can be supplied to the cleaning unit 23. Under the pressure of the supplied cleaning medium, which reaches the cleaning nozzle 24 via the holder 26, the nozzle is rotated about its axis 25. Via the nozzle openings provided at the lower end of the cleaning nozzle 24, the cleaning medium exits and is thrown against the sidewalls 19 to 21 and the bottom 22 of the cuttings basket 18. By means of the cleaning medium, which impacts from the inner side the sidewalls 19 to 21 and the bottom 22 of the cuttings basket 18, the cuttings adhering to it are thrown back inwardly into the machine enclosure.

Depending on the size of the cuttings basket 18, it is possible to provide more than one cleaning unit 23.

By means of the cleaning unit 23, the sidewalls 19 to 21 and the bottom 22 of the cuttings basket 18 can be flushed to free them so that clogging of the cuttings basket 18 by means of cuttings generated by workpiece machining can be reliably prevented. For cleaning the cuttings basket 18, it is not required to have personnel because the cleaning of the cutting basket 18 can be carried out automatically in the described way. Even when the enclosure of the machine tool is tall and the exhaust system is mounted on the ceiling of the enclosure, a reliable cleaning of the cuttings basket 18 is ensured. Since cleaning of the cuttings basket 18 is carried out without personnel, the machine tool positioned within the enclosure must not be shut down for the cleaning operation. Cleaning of the cuttings basket 18 can be carried out optimally as soon as the exhaust output/effect decreases. In this way, a continuous exhaust efficiency/effect with continuous under pressure in the working space within the enclosure of the machine tool is ensured. The cleaning medium, in particular, cooling lubricant, does not reach the machine surroundings so that even in the surrounding areas of the enclosure there is no atmosphere that would present a health hazard.

Since the mounting frame 3 of the exhaust system is formed by angled profiled sections, it can be attached to and detached from the enclosure 1 in a simple way; also, in particular, because of the two handles 13 and 14. This is a great advantage for servicing purposes and for possible modifications. Because of the described configuration, the exhaust system has three interfaces, i.e., for the cuttings basket 18, for the cleaning unit 23, and for the exhaust socket 16. These three interfaces are mounted in a space-saving way on the exhaust system.

In FIGS. 1 and 3, a conventional exhaust socket 16 is provided which is connected to the exhaust pipe in a way known in the art.

Figure 4:
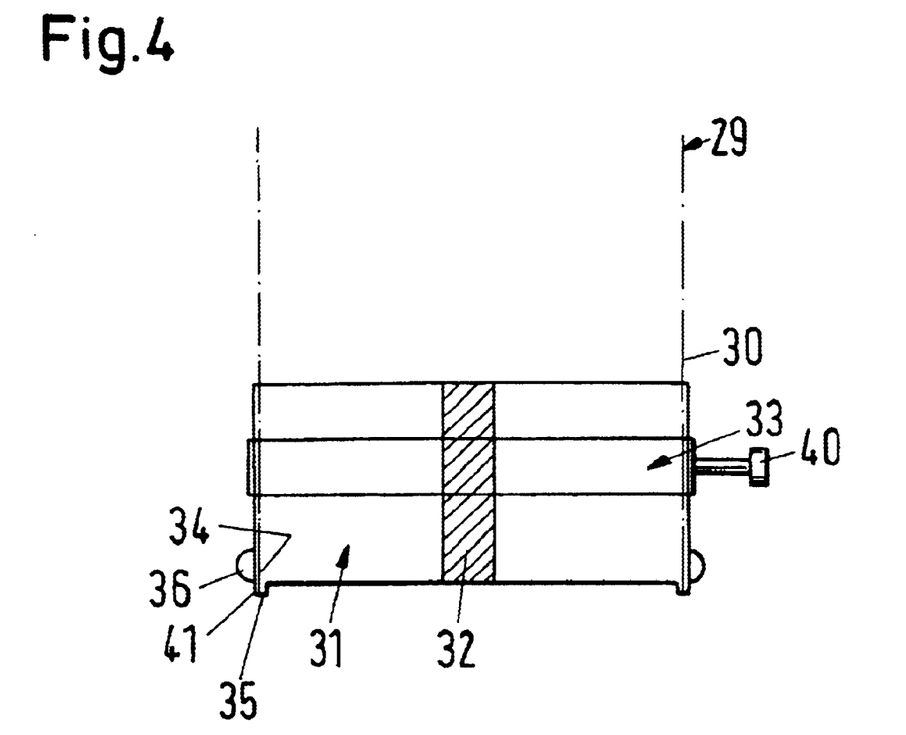
FIG. 4 a schematic illustration of the end of a hose which is to be connected to the exhaust socket of the exhaust system.
Figure 5:
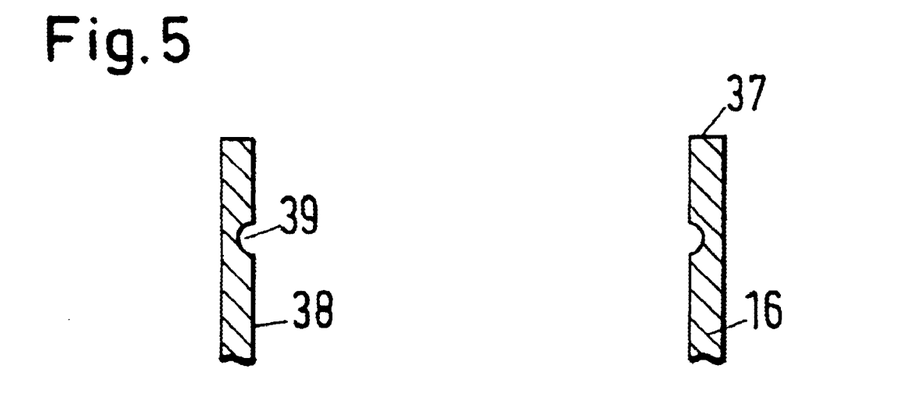
FIG. 5 an axial section of an end of the exhaust socket.

FIGS. 4 and 5 show an exhaust socket 16 to which a flexible hose 29 can be connected in a simple way. On the connecting end 34 of the hose 29, a clamping ring 31 is attached which is embodied as a spring ring and, for generating the spring properties, is provided with a slot 32. The clamping ring 31 is surrounded by a clamping device 33 which is formed, for example, as a hose clamp.

In order to prevent sliding of the clamping ring 31 on the hose 29, it is advantageously configured such that it is seated with a high clamping force on the hose end 34. Of course, it is also possible to connect the clamping ring 31 fixedly to the hose end 34.

Advantageously, the end 35 of the clamping ring 31 facing the exhaust socket 16 is folded inwardly in a U-shape. This has the advantage that the hose end 34 can be inserted simply to such an extent into the clamping ring 31 until the free hose end contacts the bottom 41 of the folded portion 35. In this way, it is ensured that the hose end 34 is inserted sufficiently far into the clamping ring 31.

Near the free end, at least one positive-locking element 36 is fastened on the clamping ring which, in the illustrated embodiment, is a ring having a cross-section that is approximately semi-circular and interrupted in the area of the slot 32. This positive-locking element 36 is advantageously a metal ring which is welded onto the peripheral surface of the clamping ring 31. The positive-locking element 36 must not be formed as a ring. It can be, for example, in the form of individual sections which in the circumferential direction of the clamping ring 31 are positioned at a distance from one another. The positive-locking element 36 serves for reliably securing the hose 29 axially fixedly on the exhaust socket 16 in the mounted position. Accordingly, the positive-locking element 36 is configured such that it can reliably perform this axial securing function.

Since in the preferred embodiment the positive-locking element in cross-section has a curved exterior, it can be moved easily into the mounting position during the attachment process of the hose 29 on the exhaust socket 16.

At a spacing from its free end face 37, the exhaust socket 16 has in its inner wall 38 a positive-locking counter element 39 which is engaged positive-lockingly by the positive-locking element 36 in the mounted position of the hose 29. When the positive-locking element 36 is a ring, the positive-locking counter element 39 is an annular groove in the inner wall 38 of the socket 16. The cross-sectional shape of the positive-locking counter element 39 is matched to the cross-sectional shape of the positive-locking element 36 so that the positive-locking element in the mounted position rests areally against the wall of the positive-locking counter element 39.

The clamping ring 31, relative to its outer diameter, is configured such that it can be inserted into the socket 16 only in the compressed state. For this purpose, the clamping ring 31 is elastically compressed by the clamping device 33 to such an extent that it can be inserted with the positive-locking element 36 into the socket 16. When the clamping device 33 is a hose clamp, the clamping ring 31 can be reduced continuously to any required diameter. Advantageously, the clamping ring 31 is compressed elastically to such an extent that the positive-locking element 36 upon insertion rests against the inner wall 38 of the socket 16. In this way, the hose end 34 can be inserted without problems until the positive-locking element 36 is at the level of the positive-locking counter element 39. The clamping device 33 is released again so that the clamping ring 31 is elastically widened. When doing so, the positive-locking element 36 moves into the positive-locking counter element 39.

The clamping ring 31 is configured such that in the mounted position it rests at a high pressing force against the inner wall 38 of the socket 16. The slot 32 is so wide that the clamping ring 31 can be compressed elastically sufficiently in order to insert it together with the positive-locking element 36 into the socket 16.

In order to simplify the connecting action of the hose 29 on the socket 16, the clamping device 32 is advantageously fastened on the clamping ring 31 such that it comes into contact with the end face 37 of the socket 16 when the positive-locking element 36 is at the level of the positive-locking counter element 39. Then it is only necessary during mounting to release the clamping device 33 so that the positive-locking element 36, as a result of the radial elastic widening of the clamping ring 31, moves into the positive-locking counter element 39 of the socket 16. Advantageously, the clamping device 33 is completely released so that the clamping ring 31 rests at a high clamping force against the wall 38 of the socket 16.

Since the hose 29 with its lower end 34 rests against the bottom 41 of the folded portion 35 of the clamping ring 31, escaping of the sucked-in medium through the slot 32 is reliably prevented. With this configuration, escaping of the removed medium and a return flow is prevented when the exhaust device is switched off.

In the described embodiment, the clamping force by which the clamping ring 31 is forced against the inner wall 38 of the socket 16 is derived from the spring force of the clamping ring 31 itself. However, it is also possible to configure the clamping ring 31 and the clamping device 33 such that the clamping force can be adjusted in the mounted position of the clamping ring 31. This is achieved in that the fastening device 33 is attached to the clamping ring 31. As a result of the fixed connection, the clamping ring 31 is widened or compressed mandatorily by the clamping device 33 when the clamping device 33 is actuated.

In the initial position, the clamping ring 31 and the positive-locking element 36 are configured such the clamping ring can be inserted into the socket 16. In contrast to the preceding embodiment, the clamping ring 32 is now widened with the clamping device 33. The positive-locking element 36 reaches in this way the positive-locking counter element 39. By means of the clamping device 33, the pressing force with which the clamping ring 31 rests against the inner wall 38 of the socket 16 can thus be adjusted to the respective mounting conditions, in particular, the pressing force can be readjusted anytime.

The clamping device 33 is preferably configured as a hose clamp where, by means of a clamping screw 40, a hose clamp can be widened or compressed in a way known in the art.

In the described second embodiment, the hose clamp 33 has its smallest diameter in the initial state. As soon as the clamping ring 31 is inserted into the socket 16, the hose clamp 33 is widened by actuation of the adjusting screw 40 as is known in the art. Since the clamping ring 31 is fastened on the hose clamp 33, the clamping ring 31 is widened accordingly.

In the first embodiment, in which the hose clamp 33 is not fixedly connected with the clamping ring 31, the hose clamp 33, before insertion of the clamping ring 31 into the socket 16, has a correspondingly small diameter. For attachment of the clamping ring 31 in the socket 16, the hose clamp 33 is then widened by actuation of the adjusting screw 40. The clamping ring 31 is also elastically widened correspondingly.

The exhaust system has been described in connection with an enclosure of a machine tool. The exhaust system can also be used anywhere where exhausting of rooms, devices, other machines and the like must be performed.

In the exhaust system, it is possible to eliminate the cuttings basket 18 when, for example, no cuttings are generated by using the machine tool. This is, for example, the case when within the housing-type enclosure 1 grinding processes are performed. By means of the exhaust device, air is exhausted also in this situation from the interior of the enclosure. The grinding dust generated during grinding is then entrained in the airflow and reliably removed from the interior of the enclosure.

The cleaning unit 23, in deviation from the illustrated embodiment, can also have a stationery cleaning nozzle 24 which does not rotate about its axis. In this case, about the circumference of the cleaning nozzle several nozzle openings are provided via which the cleaning medium can be expelled. In order to be able to reach all sidewalls and also the bottom of the cuttings basket 18 with the cleaning medium, it is advantageous when the cleaning nozzle projects centrally into the cuttings basket 18. The nozzle openings are provided on the cleaning nozzle 24 such that the sidewalls 19 to 21 as well as the bottom 22 of the cuttings basket 18 are completely within reach of the cleaning medium.

It is moreover possible to provide several such cleaning units 23. For example, each sidewall 19 to 21 and/or the bottom 22 of the cuttings basket 18 can have correlated therewith a cleaning unit, respectively.

Figure 6:
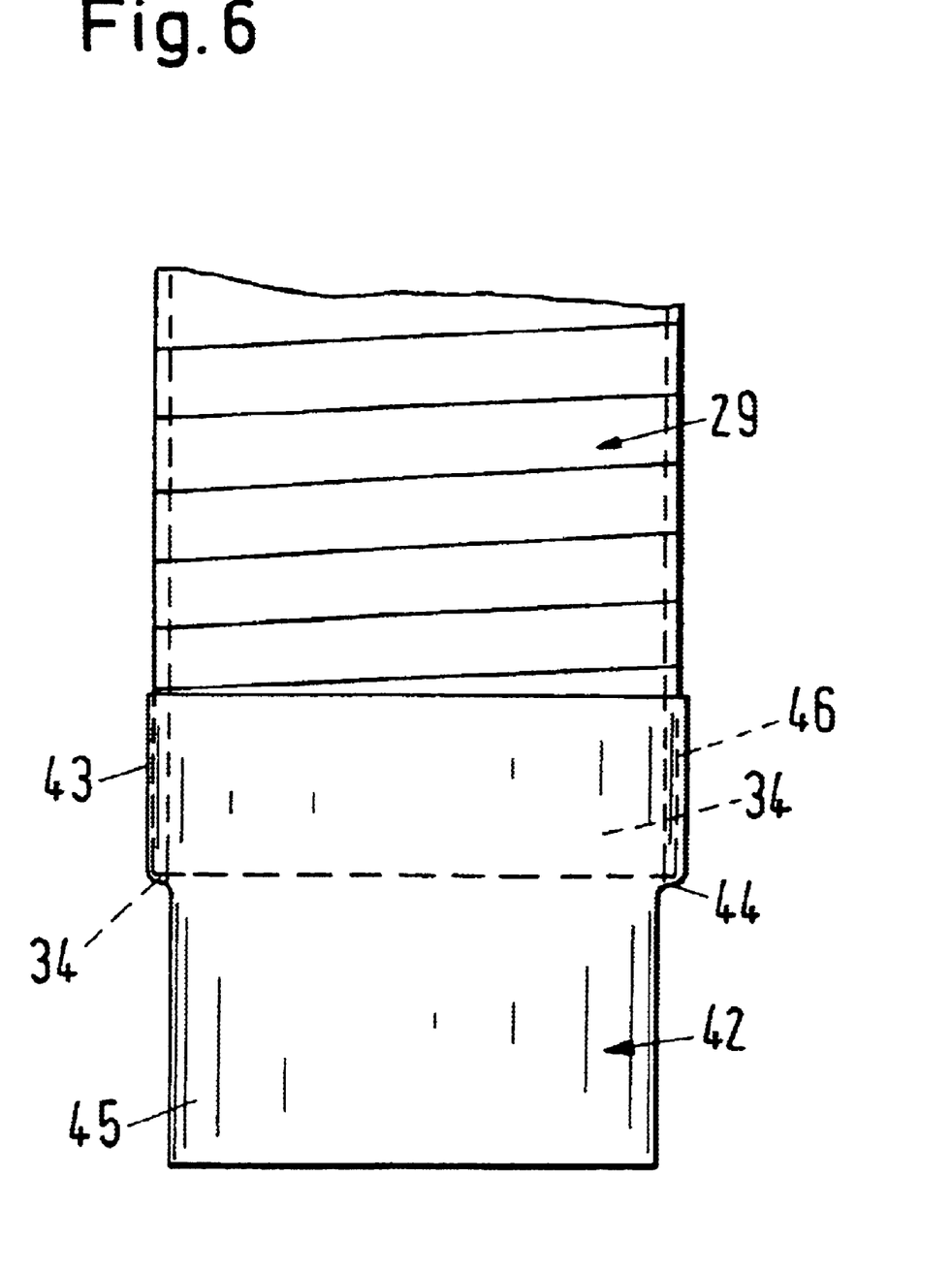
FIG. 6 a schematic illustration in a side view of a second embodiment of the exhaust hose secured in a plug-in receptacle.

FIG. 6 shows an embodiment in which the hose 29 with its connecting end 34 is inserted into a sleeve-shaped plug-in receptacle 42 and is fastened thereto. The plug-in receptacle 42 has a sleeve section 43 widened with respect to the inner and outer diameters into which the connecting end 34 is inserted. The hose 29 is positioned with its end face 34 on an annular shoulder 44 which is formed at the transition from the sleeve section 43 at the end into an insertion section 45 of the plug-in receptacle 42. The outer diameter of the connecting end 34 of the hose 29 is smaller than the inner diameter of the sleeve section 43. Into the annular space 46 formed in this way, a sealing compound is introduced by which the hose 29 is fixedly connected to the plug-in receptacle 42.

The plug-in receptacle 42 is inserted with its plug-in section 45 into the exhaust socket 16 until the plug-in receptacle 42 contacts with its annular shoulder 44 the exhaust socket 16.

Figure 7:
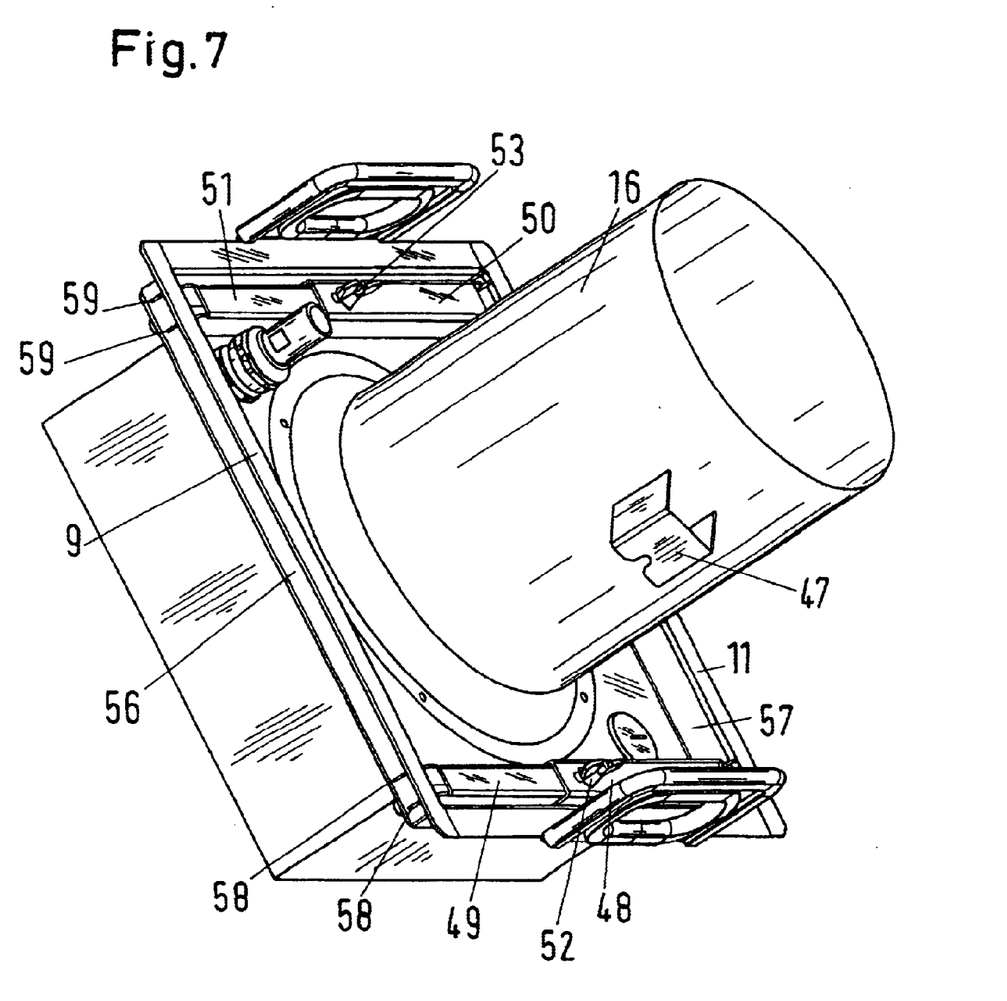
FIG. 7 a perspective illustration of the exhaust system according to the invention with clamping elements.

As shown in FIG. 7, the exhaust socket 16 is provided on diametrically opposed sides with suspension brackets 47 of which only one is shown in FIG. 7. Clamping levers (not illustrated) are suspended therefrom, as is known in the art, which are supported pivotably on the outer side of the plug-in receptacle 42. Upon insertion of these clamping levers into the suspension brackets 47 and clamping action, the plug-in receptacle 42 is clamped with its annular shoulder 44 against the end face of the exhaust socket 16. Such quick clamping devices are known and, therefore, will not be explained in more detail in this connection. By means of these quick-clamping closures, the hose 29 can be quickly mounted and detached.

The entire exhaust system can be inserted very easily into the mounting opening 2 of the enclosure as well as removed from it. For this purpose, the exhaust system has on two opposed sides slidable clamping bars 48, 49 and 50, 51 (FIGS. 1, 3 and 7) which can be moved relative to one another. The slidable clamping bars 48 to 51 are arranged on the base plate 12 adjacent to the angled edges 8, 10 of the mounting frame 3. The slidable clamping bars 48 to 51 are, for example, formed as approximately U-shaped profile sections which overlap one another telescopingly. In the area in which they are overlapped by the slidable clamping bars 48, 50, the slidable clamping bars 49, 51 are provided with an opening (not illustrated) extending in the longitudinal direction; a wing screw 52, 53 projects through the opening and clamps the two slidable clamping bars relative to one another in the clamping position. At their ends facing away from one another, the slidable clamping bars 48 to 51 are provided with two parallel clamping stays 54, 55 which project past them in the sliding direction, are arranged upright, and advantageously are monolithic parts of the sliding clamping bar, respectively.

After loosening the screws 52, 53, the slidable clamping bars can be moved on the base plate 12 to such an extent that the clamping stays 54, 55 are retracted and do not project past the sidewalls 56, 57 by which the base plate 12 is connected with the angled edges 9, 11 of the mounting frame 2. As illustrated in FIG. 7, two slot-shaped openings 58, 59 are provided in the sidewall 56 for allowing penetration of the clamping stays 54 through which the clamping stays 54 project in the clamping position. The opposite sidewall 57 is also provided with corresponding slot-shaped openings (not illustrated) for the clamping stays 55 of the slidable clamping bars 48, 50.

In the position illustrated in FIG. 7, the slidable clamping bars 48 to 51 are retracted to such an extent that the clamping stays 54, 55 do not project past the sidewalls 56, 57. In this way, the mounting frame 3 can be inserted simply into the mounting opening 2 of the enclosure 1 such that the mounting frame 3 rests with the outwardly angled edges 8 to 11 on the rim of the mounting opening 2. Subsequently, the slidable clamping bars 48 to 51 are moved outwardly relative to one another such that the clamping stays 54, 55 project through the slot-shaped openings 58, 59 in the sidewalls 56, 57. By means of these clamping stays 54, 55, the rim of the mounting opening 2 is engaged from below and, in this way, the entire exhaust system is safely secured against being lifting from the enclosure 1. The clamping stays 54, 55 are provided such that the mounting frame 3 with its angled edges 8 to 11 are pulled tightly against the exterior side of the rim of the mounting opening 2. Advantageously, the end face of the clamping stays 54, 55 facing the mounting opening 2 of the enclosure 1 extend at a slant or are rounded so that tolerances can be compensated effortlessly when tightening the exhaust system on the enclosure 1. After securing the exhaust system, the screws 52, 53 are tightened so that the slidable clamping bars 48 to 51 are clamped against one another and can no longer be pushed back into the release position.

When the exhaust system is to be demounted, only the wing screws 52, 53 must be released and the sliding clamping bars 48 to 51 must be pushed back to such an extent that the clamping stays 54, 55 no longer project past the sidewalls 56, 57 of the mounting frame 3. By means of the two handles 13, 14, the exhaust system can be lifted effortlessly.

The exhaust system with the cuttings basket 18 prevents the cuttings from being exhausted. Without the exhaust system the cuttings which have been sucked in would form nests of cuttings within the suction hose or would deposit within the exhaust device. This would result in an increased servicing expenditure, in an increased fire risk when using cooling lubricants as cleaning medium, in a limited return flow of the cooling lubricant, in additional resistance of the airflow, and would cause operational disruptions. By employing the cuttings basket 18, these advantages are reliably prevented in a constructively simple way. The mesh of the cuttings basket 18 can have a wire diameter of, for example, 0.8 mm and a mesh width of, for example, 2.5 mm. Depending on the type of application of the cuttings basket 18, other dimensions can be provided also. The cuttings basket 18 can be reliably and even permanently cleaned by means of the cleaning unit 23.

What is claimed is:

1. An exhaust system for a housing-type enclosure of machine tools, the exhaust system comprising:
    at least one exhaust location;
    at least one air-permeable catch device in an exhaust area in front of the exhaust location;
    wherein the at least one catch device is a basket having sidewalls, wherein at least one of the sidewalls is a mesh;
    wherein the basket comprises a bottom and the sidewalls of the catch device are connected to the bottom;
    wherein the bottom is at least partially a mesh.

2. The exhaust system according to claim 1, further comprising a mounting frame, wherein the exhaust location is an exhaust socket connected to the mounting frame.

3. The exhaust system according to claim 2, wherein the catch device is attached to the mounting frame.

4. An exhaust system for a housing-type enclosure of machine tools, the exhaust system comprising:

at least one exhaust location;

at least one air-permeable catch device in an exhaust area in front of the exhaust location;

a mounting frame, wherein the exhaust location is an exhaust socket connected to the mounting frame;

wherein the mounting frame has at least one handle.

5. The exhaust system according to claim 4, wherein the at least one handle projects transversely from the mounting frame.

6. The exhaust system according to claim 4, wherein the mounting frame has opposed frame sides and wherein a first one and a second one of the at least one handle are mounted on the opposed frame sides.

7. An exhaust system for a housing-type enclosure of machine tools, the exhaust system comprising:

at least one exhaust location;

at feast one air-permeable catch device in an exhaust area in front of the exhaust location;

a mounting frame, wherein the exhaust location is en exhaust socket connected to the mounting frame;

wherein the mounting frame has frame sides with outwardly angled edges and wherein the outwardly angled edges overlap a rim of a mounting opening of the enclosure.

8. An exhaust system for a housing-type enclosure of machine tools, the exhaust system comprising:

at least one exhaust location;

at least one air-permeable catch device in an exhaust area in front of the exhaust location;

a mounting frame, wherein the exhaust location is an exhaust socket connected to the mounting frame;

at least one cleaning unit for cleaning the at least one catch device, wherein the catch device is positioned in an effective range of the at least one cleaning unit.

9. The exhaust system according to claim 8, wherein the at least one catch device is a basket having sidewalls, wherein at least one of the sidewalls is a mesh.

10. The exhaust system according to claim 9, wherein the basket comprises a bottom and the sidewalls of the catch device are connected to the bottom.

11. The exhaust system according to claim 10, wherein the bottom is at least partially a mesh.

12. The exhaust system according to claim 8, wherein the at least one cleaning unit projects into the at least one catch device.

13. The exhaust system according to claim 12, wherein the at least one cleaning unit has at least one cleaning nozzle.

14. The exhaust system according to claim 13, wherein the at least one cleaning nozzle has an axis and is rotatable about the axis.

15. The exhaust system according to claim 13, wherein the at least one cleaning unit is arranged in an area between the exhaust socket and an edge of the mounting frame.

16. The exhaust system according to claim 13, wherein the at least one cleaning unit has a supply line for supplying a cleaning medium, wherein the supply line is connected to the at least one cleaning nozzle.

17. The exhaust system according to claim 16, wherein the supply line comprises a valve.

18. An exhaust system for a housing-type enclosure of machine tools, the exhaust system comprising:

at least one exhaust location;

at least one air-permeable catch device in an exhaust area in front of the exhaust location;

a mounting frame, wherein the exhaust location is an exhaust socket connected to the mounting frame;

an exhaust hose and a clamping ring arranged on the exhaust hose, wherein the clamping ring has at least one positive-locking element projecting past an outer peripheral surface of the clamping ring, wherein the exhaust socket is provided with at least one positive-locking counter element adapted to interact with the at least one positive-locking element, wherein the exhaust hose is connected to the exhaust socket such that the clamping ring contacts under tension an inner wall of the exhaust socket.

19. The exhaust system according to claim 18, wherein the at least one positive-locking element is ring-shaped and is fastened on the clamping ring.

20. The exhaust system according to claim 18, wherein the at least one positive-locking element is comprised of metal.

21. The exhaust system according to claim 18, wherein the at least one positive-locking element has a part-circular cross-section.

22. The exhaust system according to claim 18, wherein the at least one positive-locking counter element is a recess in the inner wall of the exhaust socket.

23. The exhaust system according to claim 22, wherein the recess is an annular groove.

24. The exhaust system according to claim 18, wherein the at least one positive-looking counter element is a radially outwardly formed part of the exhaust socket.

25. The exhaust system according to claim 18, wherein the clamping ring is slotted.

26. The exhaust system according to claim 18, wherein the clamping ring generates a spring force and rests under the spring force against the inner well of the exhaust socket.

27. The exhaust system according to claim 18, wherein the clamping ring rests under radial, externally applied pressure against the inner wall of the exhaust socket.

28. The exhaust system according to claim 27, further comprising a pressure device arranged on the clamping ring, wherein the pressure device acts on the clamping ring such that the clamping ring is elastically spreadable for contacting the inner wall of the exhaust socket.

29. The exhaust system according to claim 28, wherein the pressure device is a hose clamp fastened on an outer peripheral surface of the clamping ring.

30. The exhaust system according to claim 20, wherein the clamping ring has an end facing the exhaust socket and wherein the end is folded inwardly and forms a folded portion.

31. The exhaust system according to claim 30, wherein the folded portion has a U-shaped cross-section with a bottom.

32. The exhaust system according to claim 31, wherein the exhaust hose rests against the bottom of the folded portion.

33. The exhaust system according to claim 30, further comprising a plug-in receptacle insertable into the exhaust socket, wherein the exhaust hose is fastened in the plug-in receptacle.

34. The exhaust system according to claim 33, wherein the exhaust hose is fastened by a sealing compound in the exhaust socket.

35. The exhaust system according to claim 33, further comprising a quick-clamping device, wherein the plug-in receptacle is secured by the quick-clamping device on the exhaust socket.

36. An exhaust system for a housing-type enclosure of machine tools, the exhaust system comprising:

at least one exhaust location;

at least one air-permeable catch device in an exhaust area in front of the exhaust location;

a mounting frame, wherein the exhaust location is an exhaust socket connected to the mounting frame;

a clamping device for connecting the exhaust system to a mounting location.

37. The exhaust system according to claim 36, wherein the clamping device has at least two clamping elements adjustable relative to one another and adjustable from a release position into clamping position.

38. The exhaust system according to claim 37, wherein the at least two clamping elements are provided near an edge of the mounting frame.

39. The exhaust system according to claim 37, wherein the at least two clamping elements overlap one another in a telescoping fashion.

40. The exhaust system according to claim 37, wherein the at least two clamping elements are clamped relative to one another in the clamping position.

41. The exhaust system according to claim 37, wherein the at least two clamping elements have ends that are facing away from one another and are provided with at least one clamping stay, respectively.

42. The exhaust system according to claim 41, wherein the at least one clamping stay in the clamping position projects past sidewalls of the mounting frame.

43. The exhaust system according to claim 41, wherein the at least one clamping stay is retracted when in the release position.

44. The exhaust system according to 41, wherein the at least one clamping stay in the clamping position engages underneath a rim of a mounting opening of the enclosure.

* * * * *